United States Patent
Gosha

(10) Patent No.: US 10,063,754 B2
(45) Date of Patent: Aug. 28, 2018

(54) MOBILE DEPOSIT KIT

(71) Applicant: Diane Gosha, Phenix City, AL (US)

(72) Inventor: Diane Gosha, Phenix City, AL (US)

( * ) Notice: Subject to any disclaimer, the term of this patent is extended or adjusted under 35 U.S.C. 154(b) by 386 days.

(21) Appl. No.: 14/589,982

(22) Filed: Jan. 5, 2015

(65) Prior Publication Data

US 2015/0193747 A1     Jul. 9, 2015

Related U.S. Application Data

(60) Provisional application No. 61/923,648, filed on Jan. 4, 2014.

(51) Int. Cl.
*B65D 75/00* (2006.01)
*H04N 5/225* (2006.01)

(52) U.S. Cl.
CPC ......... *H04N 5/2253* (2013.01); *H04N 5/2251* (2013.01)

(58) Field of Classification Search
USPC ........ 248/174, 176.1, 176.3; 396/1, 2, 5, 19, 396/419, 175; 355/21, 67; 206/223
See application file for complete search history.

(56) References Cited

U.S. PATENT DOCUMENTS

| | | | | |
|---|---|---|---|---|
| 2,936,684 A * | 5/1960 | Simjian | ............ | G07D 11/0096 194/205 |
| 3,514,206 A * | 5/1970 | Harvey | ................ | G03B 15/03 355/21 |
| 3,699,252 A * | 10/1972 | Jackson | ............... | G03B 17/561 348/373 |
| 4,076,413 A * | 2/1978 | Smeaton | ................ | G03B 33/00 355/32 |
| 4,187,015 A * | 2/1980 | Katsof | ................... | G03B 17/24 396/322 |
| 5,285,226 A * | 2/1994 | Frosig | .................. | G03B 27/323 248/174 |
| 2014/0086567 A1* | 3/2014 | Feke | ....................... | G03B 15/06 396/4 |
| 2016/0178112 A1* | 6/2016 | Shi | ....................... | F16M 11/046 348/150 |

* cited by examiner

*Primary Examiner* — Jacob K Ackun

(74) *Attorney, Agent, or Firm* — Jones IP Law, LLC; Dennis W. Jones

(57) ABSTRACT

A mobile deposit kit for use with a mobile deposit application of a mobile device provides a container having (1) a top, a bottom, and a back, and further includes two sides each adjoining to the top, the bottom, and the back, (2) at least one series of fasteners along back and the two sides at a specified distance from the bottom, (3) a tray supported by the fasteners, and including (a) a base, (b) a stencil, and (c) an opening within the stencil corresponding to specified check measurements, (4) an opening in the top sufficiently sized to correspond to a camera lens of a mobile device, and wherein the top includes outline markings for placement of the mobile device, whereby the mobile device is utilized for securing at least one check image for use in a mobile deposit application.

5 Claims, 5 Drawing Sheets

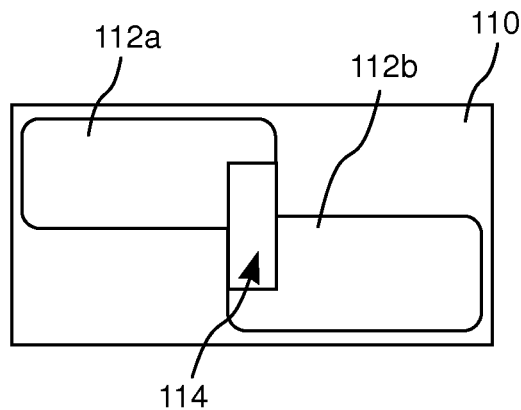
Fig. 3-A
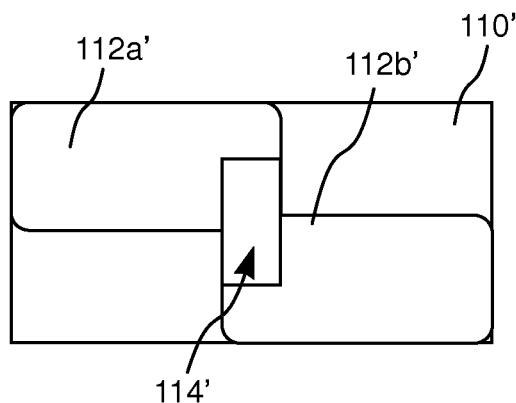
Fig. 3-B

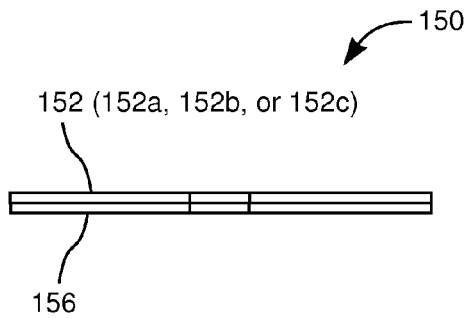
Fig. 4
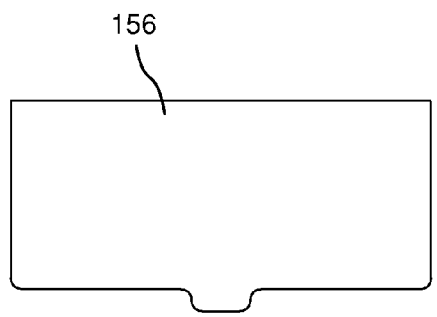
Fig. 5
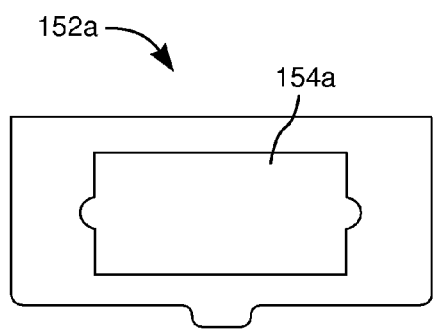
Fig. 6-A
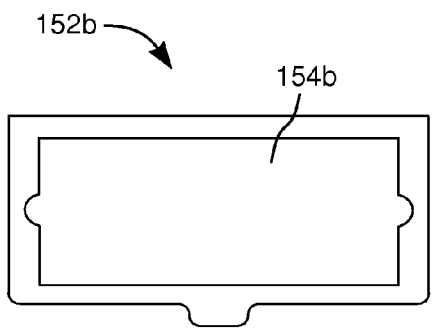
Fig. 6-B
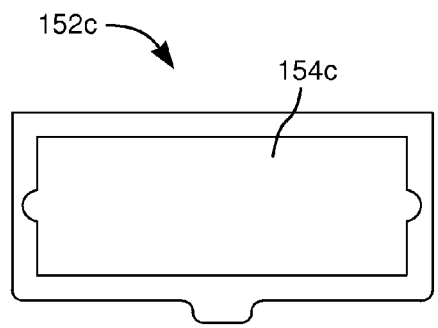
Fig. 6-C

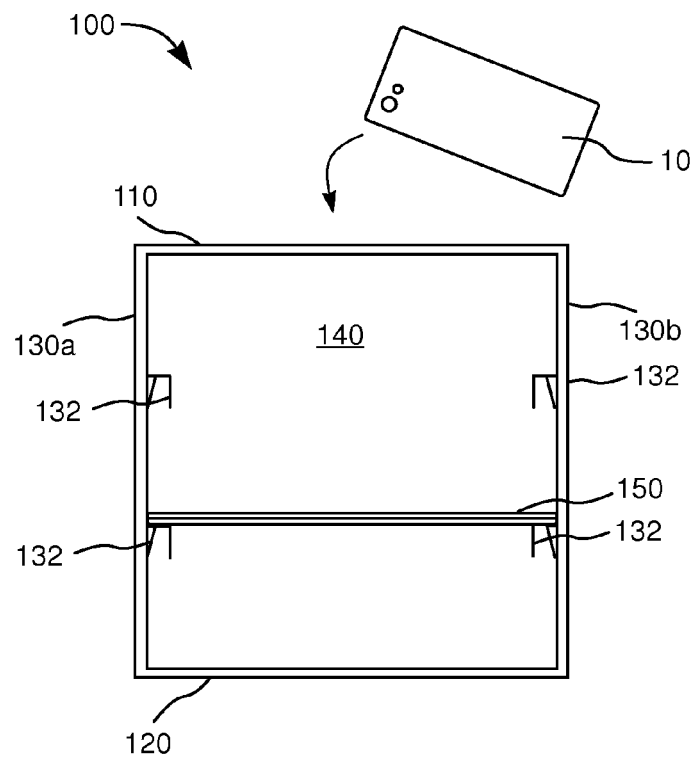
Fig. 7-A
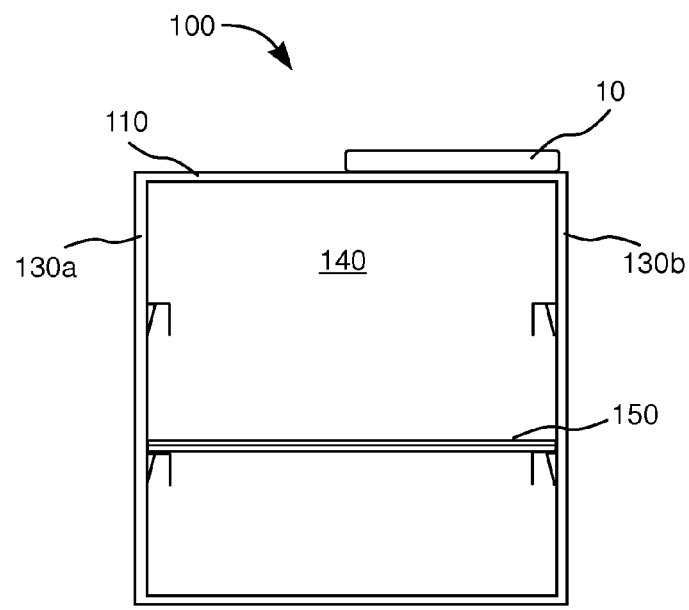
Fig. 7-B

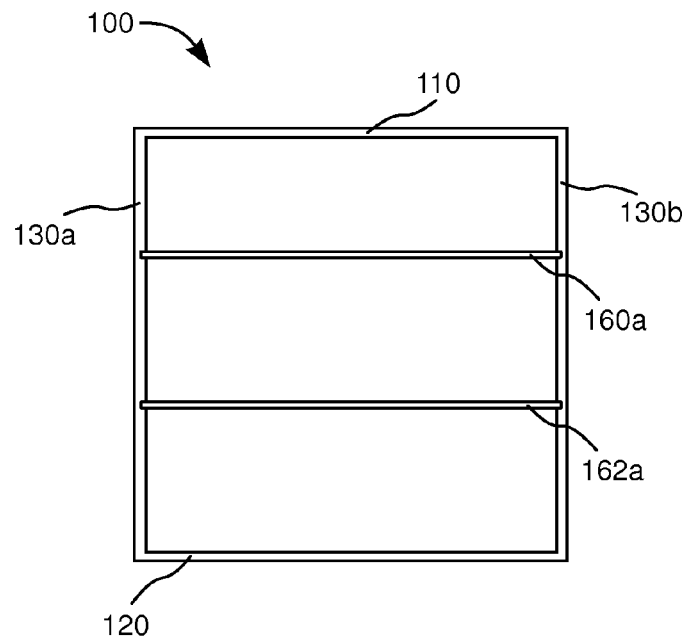
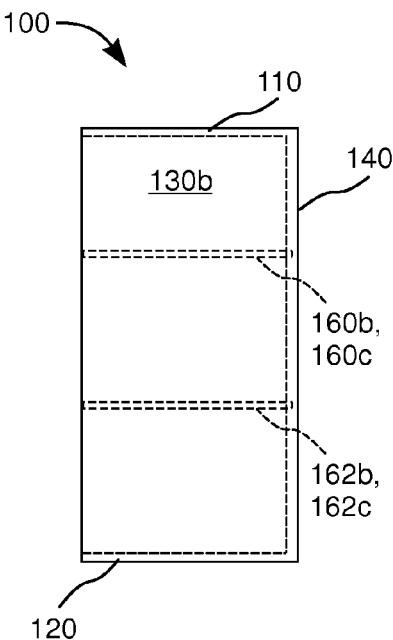
Fig. 8-A  Fig. 8-B
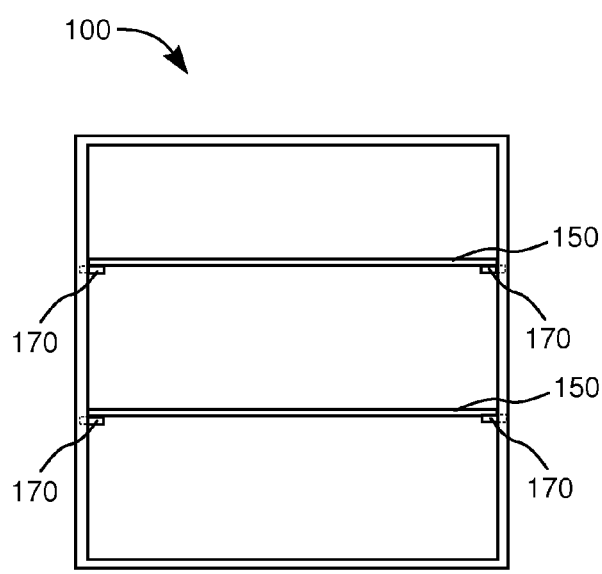
Fig. 8-C

MOBILE DEPOSIT KIT

BACKGROUND

This invention pertains to banking via mobile communication devices. More particularly, this invention pertains to acquiring check images necessary for remote deposit via smart phones and other mobile communication devices.

Banks are encouraging customers to take advantage of depositing checks remotely via computer. Such a deposit requires a digital image of the check be captured via digital camera, smart phones, and such like. In particular, many banks have developed applications that can be downloaded to a user's (customer) smart phone for securely capturing an image of the check and then depositing the funds into the user's account.

However, capturing a clean image of a check is not always a simple process. Many individuals can have problems maintaining enough steadiness to take a clean picture. For example, the elderly, individuals with Alzheimer's disease, Parkinson's, and other conditions that cause shakes and tremors, may have difficulty holding a smart phone steady at least part of the time. Others may just have difficulty holding a camera or smart phone steady enough to capture a clear image.

BRIEF SUMMARY

According to one embodiment of the present invention, a deposit kit for use with mobile computing devices is provided. The deposit kit includes a container having (1) a top, a bottom, and a back, and further includes two sides each adjoining to the top, the bottom, and the back, (2) at least one series of fasteners along back and the two sides at a specified distance from the bottom, (3) a tray supported by the fasteners, and including (a) a base, (b) a stencil, and (c) an opening within the stencil corresponding to specified check measurements, (4) an opening in the top sufficiently sized to correspond to a camera lens of a mobile device, and wherein the top includes outline markings for placement of the mobile device, whereby the mobile device is utilized for securing at least one check image for use in a mobile deposit application.

In one embodiment the mobile deposit application corresponds to a specified banking institution.

In another embodiment, the deposit kit includes a plurality of stencils for use with the tray. The plurality of stencils include an opening for at least one of a standard size personal check, a standard size business check and an oversized check.

The plurality of stencils include openings measuring at least: 6 inches by 2⅞ inches, 8⅝ inches by 3½ inches, and 8¾ inches by 3³⁄₁₀ inches.

In one embodiment, the mobile device is a smart phone.

In one embodiment, the deposit kit includes interconnection between the top, the bottom, the back, and the two sides so that the deposit kit unfolds into a flat assembly.

In one embodiment, the deposit kit includes an open front for inserting the tray.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The above-mentioned features will become more clearly understood from the following detailed description read together with the drawings in which:

FIG. 3-A is a top view of the mobile deposit kit of FIG. 1;

FIG. 3-B is a top view of an alternative mobile deposit kit of FIG. 1;

FIG. 4 is a tray for placement of checks within the mobile deposit kit;

FIG. 5 is a base for use with a stencil to form the tray of FIG. 4;

FIG. 6-A is a stencil for placement of checks within the tray of the mobile deposit kit;

FIG. 6-B is another embodiment of a stencil for placement of checks within the tray of the mobile deposit kit; and FIG. 6-C is another embodiment of a stencil for placement of checks within the tray of the mobile deposit kit;

FIG. 7-A is a front view illustrating the use of the mobile deposit kit with a smart phone;

FIG. 7-B is a front view illustrating a smart phone in place for the use of the mobile deposit kit;

FIG. 8-A is a front view illustrating an alternative embodiment of a mobile deposit kit;

FIG. 8-B is a side view of the alternative embodiment mobile deposit kit of FIG. 8-A; and FIG. 8-C is a front view illustrating another alternative embodiment of a mobile deposit kit.

DETAILED DESCRIPTION

A mobile deposit assistance kit, for acquiring check images via smart phones and other mobile communication devices for remote deposit into a user's (customer) bank account, is disclosed.

Banks are encouraging customers to take advantage of depositing checks remotely via computer. Such a deposit requires a digital image of the check be captured via digital camera, smart phones, and such like. In particular, many banks have developed applications that can be downloaded to a user's (customer) smart phone for securely capturing an image of the check and then depositing the funds into the user's account.

However, capturing a clean image of a check is not always a simple process. Many individuals can have problems maintaining the smart phone steady enough to take a clean picture. For example, the elderly, individuals with Alzheimer's disease, Parkinson's, and other conditions that affect steadiness of hand, may sometimes have difficulty holding a smart phone steady at least part of the time. Other's may just have difficulty holding a camera or smart phone steady enough for capturing a good image.

Figure 1:
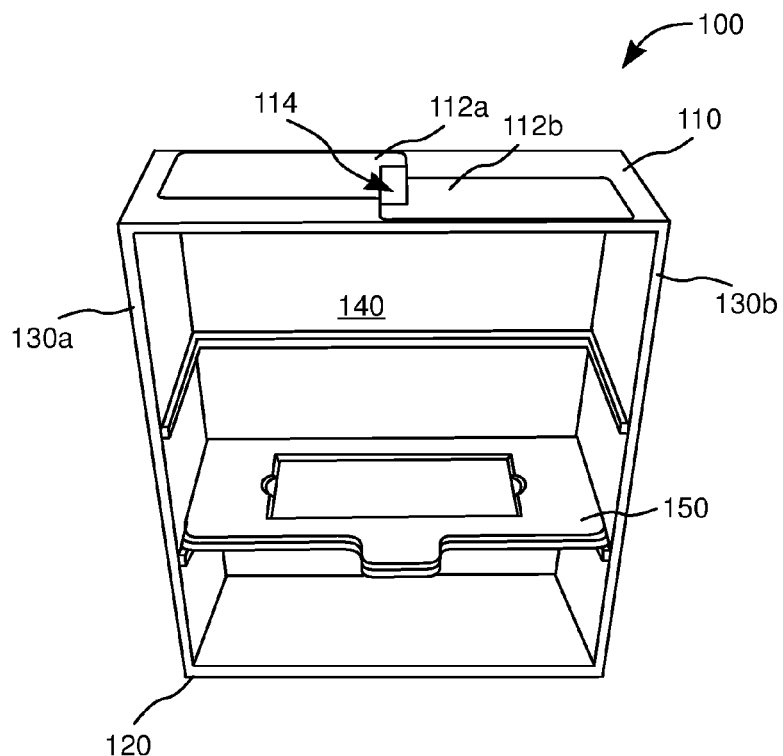
FIG. 1 is a perspective view of a mobile deposit kit.

FIG. 1 is a perspective view of a mobile deposit kit 100. In the illustrated embodiment, the mobile deposit kit 100 is a box type container that includes a top 110, a bottom 120, opposing sides 130*a*, 130*b* each attached to the top 110, to the bottom 120, and to a back 140. Multiple type trays 150 are available for placement of a check within the mobile deposit kit 100. Once a tray 150 enclosing a check is placed within the mobile deposit kit 100, a smart phone is used to capture an image of the check. Each tray 150 includes an area for placement of the check so that the check is properly positioned within the viewfinder of the smart phone camera.

The mobile deposit kit 100 has the general shape of a box with an open front so as to create a drawer or closet type effect. In this way, the lighting is controlled primarily by the flash (or lack thereof) of the smart phone being utilized for capturing images. In one embodiment, the mobile deposit kit 100 is assembled from a lightweight plastic type material. The top 110, bottom 120, sides 130a, 130b, and back 140 are adjoined such that the back connects to both sides 130a, 130b, the top 110, and the bottom. In the illustrated embodiment, the back 140 is the only piece that connects to each of the remaining portions (top 110, bottom 120, sides 130a, 130b, and back 140). The pieces are interconnected in a manner that provides for folding the mobile deposit kit 100 into a flat assemblage for ease of transport. It should be appreciated that the pieces of the mobile deposit kit 100 may be made from varying types of plastic, cardboard, lightweight wood, and varying lightweight metals and alloys. The top 110, bottom 120, sides 130a, 130b, and back 140 of the mobile deposit kit 100 may constructed from a single interconnected piece adjoined so that the mobile deposit kit 100 may be disassembled by folding. The mobile deposit kit 100, may also be constructed from multiple pieces (top 110, bottom 120, sides 130a, 130b, and back 140) interconnected via various fastener and or hinge devices such as are know in the art.

The top 110 includes a pair of outlines 112a, 112b for placement of a smart phone, and an opening 114 for the camera lens of the smart phone. The opening is situated to accommodate a wide variety of smart phones, including iPhone®, Motorola®, Samsung®, and LG®, among many other available models. With the lens of a smart phone facing toward the opening 114, the opening is situated near the center of the top 110.

In the illustrated embodiment, the inside of both sides 130a, 130b are black or a suitably dark color. The inside of the top 110, bottom 120, and the back 140 are white or a suitable light color. It is expected that experimentation may produce other color combinations that provide good or desirable results for capturing the check images.

Figure 2:
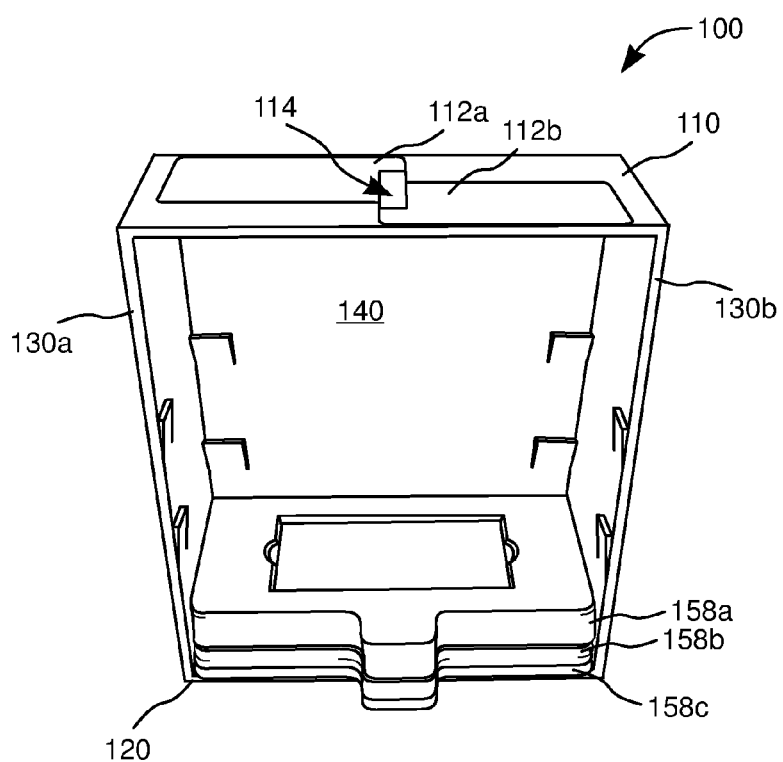
FIG. 2 is a perspective view of an alternative mobile deposit kit.

FIG. 2 is a perspective view of an alternative mobile deposit kit 100 that makes use of alternative type trays 158a, 158b, 158c. The alternative trays 158a, 158b, 158c of FIG. 2 have varying thicknesses and may be stacked in varying locations within the mobile deposit kit 100 to achieve the best results for clear focus and desired size of the image obtained.

FIG. 3-A is a view of the top 110 of the mobile deposit kit 100 and FIG. 3-B is a view of the top 110' of an alternative mobile deposit kit 100. The top 110 illustrated in FIG. 3-A includes a pair of outlines 112a, 112b for placement of a smart phone, and an opening 114 for the camera lens of the smart phone. The top 110' illustrated in FIG. 3-B includes a pair of outlines 112a', 112b' for placement of a smart phone, and an opening 114' for the camera lens of the respective smart phone. Both tops 110, 110' have an opening that is situated to accommodate a wide variety of smart phones, including iPhone®, Motorola®, Samsung®, and LG®, among many other available models. With the lens of a smart phone facing toward the respective opening 114, 114' the opening 114, 114' is situated near the center of the respective top 110'.

In FIG. 3-A, the outlines 112a, 112b, correspond roughly to the size of an iPhone 5 and other similarly sized smart phones. FIG. 3-B includes outlines 112a', 112b' that correspond roughly to the size of an iPhone 6 and other similarly sized smart phones that have a larger footprint. It should be appreciated that the size of the respective outlines 112a, 112b, and outlines 112a', 112b' are suggestive of the location for placing a smart phone to achieve an optimal image of a respective check. Larger or smaller smart phones may also be used with the mobile deposit kit 100.

FIG. 4 is a tray 150 for placement of checks within the mobile deposit kit 100 and FIG. 5 is a base 156 for use with respective stencils to assemble the tray 150. In the illustrated embodiment, the tray 150 includes a base 156 and one stencil (template) 152 (152a, 152b, or 152c below). The respective stencil 152 rests on the base 156 for insertion into the mobile deposit kit 100. As with the above pieces of the mobile deposit kit 100, the base 156 in the illustrated embodiment is made from lightweight plastic, though other lightweight materials will also serve the purpose.

FIG. 6-A is a stencil 152a for placement of checks within the tray of the mobile deposit kit 100, FIG. 6-B is another embodiment of a stencil 152b for placement of checks within the tray of the mobile deposit kit 100, and FIG. 6-C is another embodiment of a stencil 152c for placement of checks within the tray of the mobile deposit kit 100.

The stencils 152a, 152b, 152c (collectively 152 as noted above and in FIG. 4), represent varying size checks for which an image may be captured. In the illustrated embodiments, the stencil is black for best results. As noted above, it is expected that experimentation may produce other color combinations that provide good or desirable results for capturing the check images. Utilizing a stencil 152 provides for stabilizing the check with respect to the smart phone 10, and also eliminates the need for moving the smart phone 10 back and forth toward and away from the check in an attempt to garner the entire check image at a desired size and focus.

In one embodiment, the stencil 152a provides a check opening 154a measuring 6"×2⅞". Such an opening provides for sufficient space for most standard size personal checks used by individuals. The stencil 152a is placed atop the base 156 to form a tray 150, and so that a check within these measurements fits within the stencil and rests on the base. Utilizing a single base with each of the stencils 152 reduces cost of production and reduces the weight of the mobile deposit kit 100. The assembled tray 150 is placed within the mobile deposit kit 100 at a desired height above the bottom 120 to provide for a clear image for capture by the smart phone 10. It is generally expected that placing the tray 150 with the personal or standard stencil 152a nearer the top 110 of the mobile deposit kit 100 will provide a better image of the check. However, the tray 150 may, of course, be placed at any available height according to the desired results.

In one embodiment, the stencil 152b provides a check opening 154b measuring 8⅝"×3½". Such an opening provides for sufficient space for most business size checks. The stencil 152b is placed atop the base 156 to form a tray 150, and so that a check within these measurements fits within the stencil and rests on the base. The assembled tray 150 is placed within the mobile deposit kit 100 at a desired height above the bottom 120 to provide for a clear image for capture by the smart phone 10. It is generally expected that placing the tray 150 with the business stencil 152b nearer the middle or bottom 120 of the mobile deposit kit 100 will provide a better image of the check. However, the tray 150 may, of course, be placed at any available height according to the desired results.

In another embodiment, the stencil 152c provides a check opening 154c measuring 8¾"×3³⁄₁₀". Such an opening provides for sufficient space for most remaining large or oversized checks. The stencil 152c is placed atop the base 156 to form a tray 150, and so that a check within these measurements fits within the stencil and rests on the base. The assembled tray 150 is placed within the mobile deposit kit 100 at a desired height above the bottom 120 to provide for a clear image for capture by the smart phone 10. It is generally expected that placing the tray 150 with the oversized business stencil 152c nearer the bottom 110 of the mobile deposit kit 100 will provide a better image of the check. However, the tray 150 may, of course, be placed at any available height according to the desired results.

FIG. 7-A is a front view illustrating the use of the mobile deposit kit 100 with a smart phone 10, and FIG. 7-B is a front view illustrating the smart phone 10 in place for the use of the mobile deposit kit 100. An endorsed check is placed with the stencil 152 of the tray 150, and the assembled tray 150 is placed within the mobile deposit kit 100 at the desired distance above the bottom 120 and in view of the opening 114. In some embodiments, it is desirous to capture images of both sides of the endorsed check. This is accomplished by simply turning the check over after capturing the image of the first side. The smart phone 10 is placed on the top 110 of the mobile deposit kit 100 according to one of the outlines 112a, 112b and with the camera lens aligned over the opening 114. Once the tray 150 is in place with the check, the smart phone 10 mobile deposit application is utilized to capture the image or images necessary for deposit with the respective banking institution. The operation of the particular smart phone 10 mobile deposit application may vary according to the respective banking institution.

In the illustrated embodiment, the tray 150 rests on a series of brackets 132 extending around the sides 130a, 130b, and back 140 of the mobile deposit kit 100. It should be appreciated that many type brackets, pegs, grooves, and other fasteners may be utilized for supporting the tray 150 within the mobile deposit kit 100. Brackets 132 and other such fasteners are installed at various heights according to the desired results. In the illustrated embodiment, there are two levels of brackets 132 in addition to the bottom 120 of the mobile deposit kit 100 that may be used as available heights for the tray 150.

After the tray 150 is situated within the mobile deposit kit 100, the smart phone 10 application is opened and then utilized to enter the required information, capture the images of the check, and finalize the deposit. Of course, multiple check images may be captured in the same manner according to the situation. As above, the operation of the particular smart phone mobile deposit application may vary according to the respective banking institution. The user should consult with their respective banking institution for instructions regarding their particular mobile deposit application.

FIG. 8-A is a front view illustrating an alternative embodiment of a mobile deposit kit 100 and FIG. 8-B is a side view of the same alternative embodiment mobile deposit kit 100. In the illustrated embodiment, the tray 150 is securable within grooves 160a, 160b, 160c and grooves 162a, 162b, 162c around the back 140 and respective sides 130a, 130b of the mobile deposit kit 100. The tray 150 easily slides within the respective groove 160a, 160b, 160c or 162a, 162b, 162c. In this manner, the tray 150 is secure within the mobile deposit kit 100 and the chances for bumping the tray 150 out of the mobile deposit kit 100 while capturing the check images is reduced.

FIG. 8-C is a front view illustrating another alternative embodiment of a mobile deposit kit 100. In the illustrated embodiment, the tray 150 is secured by bracket pegs 170. The pegs 170 are inserted into holes at the desired tray elevations within the mobile deposit kit 100 and the tray rests upon the pegs 170 much like shelves within a cabiner.

Those skilled in the art will recognize that many type fasteners and brackets can be used to support the tray 150 without departing from the spirit and scope of the present invention.

From the foregoing description, it will be recognized by those skilled in the art that a mobile deposit kit 100 for securing a check within a tray 150 at a desired and stable height above the bottom 120 and below the opening 114 within the top 110, and for securing a clear and in-focus image of the check image via a smart phone 10 mobile deposit application has been provided.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A mobile deposit kit for use with mobile computing devices, the mobile kit comprising:
   a container having a top, a bottom, and a back, two sides, and an open front opposite the back;
   a tray supported within the container, the tray further including:
   a base;
   a stencil; and
   an opening within the stencil corresponding to specified check measurements;
   an opening in the top sufficiently sized to correspond to a camera lens of a mobile device, wherein the top includes outline markings for placement of the mobile device,
   whereby the mobile device is utilized for securing at least one check image for use in a mobile deposit application.

2. The mobile deposit kit of claim 1, wherein each of two sides adjoin to the top, the bottom, and the back.

3. The mobile deposit kit of claim 1, the mobile deposit kit further comprising a plurality of stencils for use with the tray.

4. The mobile deposit kit of claim 3, wherein the plurality of stencils include an opening for at least one of:
   a standard size personal check, the standard size personal check having dimensions of 6 inches by 2⅞ inches;
   a standard size business check, the standard size business check having dimensions of 8⅝ inches by 3½ inches; and
   an oversized check, the oversized check having dimensions of 8¾ inches by 3³⁄₁₀ inches.

5. The mobile deposit kit of claim 3, wherein the plurality of stencils include an opening measuring at least:
   6 inches by 2⅞ inches;
   8⅝ inches by 3½ inches; and
   8¾ inches by 3³⁄₁₀ inches.

* * * * *